Feb. 19, 1929.
J. PORTER
1,702,705
PROCESS OF AND APPARATUS FOR THE ELECTRO DEPOSITION OF RUBBER
Filed Feb. 24, 1928
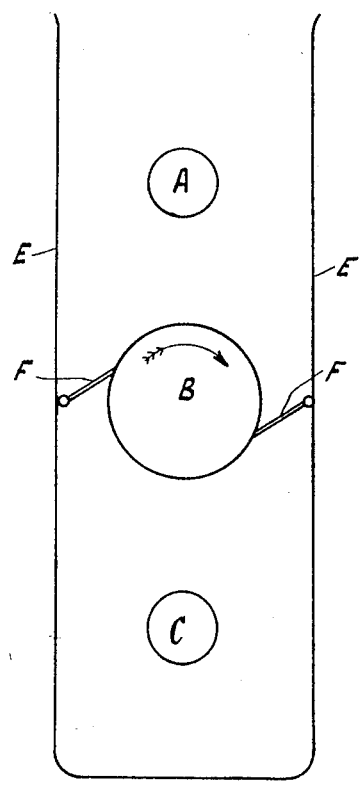
Inventor
John Porter
By
Pennie, Davis, Marvin Edmonds
Attorneys Patented Feb. 19, 1929.

1,702,705

UNITED STATES PATENT OFFICE.

JOHN PORTER, OF ROTHESAY, BUTESHIRE, SCOTLAND.

PROCESS OF AND APPARATUS FOR THE ELECTRODEPOSITION OF RUBBER.

Application filed February 24, 1928, Serial No. 256,508, and in Great Britain February 13, 1928.

This invention has reference to the electro-deposition of rubber from rubber latex whereby to obtain rubber in the form of a sheet.

According to the invention the electro-deposition is effected in a bath containing rubber latex and ammonia solution, these two components being separated so far as practicable by a diaphragm consisting of a revoluble cylinder constituted by a bi-polar electrode and hinged flaps, doors or the like extending from the walls of the bath and tangent to the cylinder.

Preferably the cylinder revolves on a horizontal axis, the bath being filled with latex up to about the level of the axis of the cylinder and the ammonia solution being above.

The anode and the cathode are located on opposite sides of the diaphragm, the anode in the upper half of the bath and the cathode in the lower half of the bath, i. e., the anode is immersed in the ammonia solution and the cathode in the latex, while the lower half of the cylinder is exposed to latex and the upper half to ammonia solution.

The bi-polar electrode is of readily oxidizable metal, such as lead, for example.

In operation, with the bi-polar electrode revolving and current passing through the bath, rubber is deposited by electrophoresis on the under side of the bi-polar electrode and at the same time oxygen is liberated at that side of the bi-polar electrode.

Inasmuch, however, as the bi-polar electrode is of readily oxidizable metal, the oxygen is taken up by the metal of the electrode so that there is no tendency to sponge formation of the rubber deposited. In the rotation of the bi-polar electrode the metallic oxide is reduced on entering the ammonia solution. In this way the section of the bi-polar electrode nearer to the cathode is always in a condition to take up oxygen.

Baffles may be interposed between the cathode and the bi-polar electrode to modify the lines of current flow and to effect any desired distribution of the rubber deposited.

The rubber layer deposited on the bi-polar electrode may be removed when the desired thickness has been obtained.

The invention is illustrated diagrammatically in the figure of the accompanying drawing.

As shown A denotes the anode. C the cathode and B the cylindrical revoluble bi-polar electrode, all immersed in a bath having walls E to which are pivoted flaps F tangent to the cylindrical bi-polar electrode.

The bi-polar electrode and the flaps together constitute a diaphragm separating the upper from the lower half of the bath.

The lower half of the bath is filled with latex and the upper half filled with ammonia solution.

The bi-polar electrode may be of lead or otherwise readily oxidizable metal.

As is understood, rubber is deposited on the revolving bi-polar electrode which is alternately exposed to an oxidizing and a reducing action.

I claim:—

1. A process of effecting electro-deposition of rubber in sheet form from rubber latex consisting in depositing the rubber on the surface of a bi-polar electrode of readily oxidizable metal, while oxidizing the metal, and reducing the metallic oxide concomitantly with the deposition.

2. A process of effecting electro-deposition of rubber in sheet form from rubber latex consisting in subjecting to electric current separate layers of latex and ammonia solution, depositing rubber on a bi-polar electrode positioned at the plane of separation of the latex and the solution of ammonia and revolving said bi-polar electrode so as to expose it alternately to latex and ammonia solution.

3. Apparatus for effecting the electro-deposition of rubber comprising a bath containing ammonia solution and rubber latex in superposed layers, an anode in the upper half of the bath, a cathode in the lower half of the bath and a diaphragm separating said layers, said diaphragm consisting of a revoluble cylindrical bi-polar electrode of readily oxidizable metal and flaps pivoted to the walls of the bath and tangent to the surface of said bi-polar electrode.

In testimony whereof I have signed my name to this specification.

JOHN PORTER.